United States Patent
Singer et al.

(10) Patent No.: US 12,325,177 B2
(45) Date of Patent: Jun. 10, 2025

(54) MICROFRACTURED FILM AND METHOD FOR MAKING

(71) Applicant: 3M INNOVATIVE PROPERTIES COMPANY, St. Paul, MN (US)

(72) Inventors: Andrew P. Singer, St. Paul, MN (US); Thomas E. Pahl, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1213 days.

(21) Appl. No.: 17/042,758

(22) PCT Filed: Mar. 27, 2019

(86) PCT No.: PCT/IB2019/052505
§ 371 (c)(1),
(2) Date: Sep. 28, 2020

(87) PCT Pub. No.: WO2019/186428
PCT Pub. Date: Oct. 3, 2019

(65) Prior Publication Data
US 2021/0017425 A1    Jan. 21, 2021

Related U.S. Application Data

(60) Provisional application No. 62/649,672, filed on Mar. 29, 2018.

(51) Int. Cl.
*B29C 59/04*    (2006.01)
*B29C 59/02*    (2006.01)
(Continued)

(52) U.S. Cl.
CPC ............ *B29C 59/04* (2013.01); *C08J 5/18* (2013.01); *C09J 7/243* (2018.01); *C09J 7/38* (2018.01);
(Continued)

(58) Field of Classification Search
CPC . B29C 59/007; B29C 59/04; B29C 2059/023; C09J 7/243; C09J 7/38;
(Continued)

(56) References Cited

U.S. PATENT DOCUMENTS 3,718,059 A * 2/1973 Clayton .................. B29C 59/04
                                                      83/171
4,726,977 A    2/1988 Goldstein
(Continued)

FOREIGN PATENT DOCUMENTS

CN         1840324       10/2006
WO    WO 2000-066355    11/2000
(Continued)

OTHER PUBLICATIONS

International Search Report for PCT International Application No. PCT/IB2019/052505, mailed on Aug. 1, 2019, 4 pages.

*Primary Examiner* — Jeffrey M Wollschlager
*Assistant Examiner* — Jeff Wollschlager

(57) ABSTRACT

A method for imparting hand-tearability to an organic polymeric film by impinging a multiplicity of ceramic microblades on a major surface of the organic polymeric film. The resulting microfractured organic polymeric film can be used as a hand-tearable tape backing for a hand-tearable adhesive tape.

19 Claims, 5 Drawing Sheets

(51) Int. Cl.
*B29K 623/00* (2006.01)
*B29L 7/00* (2006.01)
*C08J 5/18* (2006.01)
*C09J 7/24* (2018.01)
*C09J 7/38* (2018.01)

(52) U.S. Cl.
CPC .... *B29C 2059/023* (2013.01); *B29K 2623/12* (2013.01); *B29K 2995/0053* (2013.01); *B29L 2007/007* (2013.01); *C09J 2301/16* (2020.08); *C09J 2301/302* (2020.08); *C09J 2423/106* (2013.01)

(58) Field of Classification Search
CPC .............. C09J 2301/16; C09J 2301/302; C09J 2423/106; C09J 7/22; B29K 2623/12; B29K 2995/0053; B29L 2007/007; C08J 7/06; C08J 2323/12; C08J 5/18
See application file for complete search history.

(56) References Cited

U.S. PATENT DOCUMENTS

| | | | | |
|---|---|---|---|---|
| 5,128,205 | A * | 7/1992 | Butler | B29C 48/08 428/407 |
| 5,352,108 | A * | 10/1994 | Kagawa | B30B 3/04 425/290 |
| 5,593,632 | A * | 1/1997 | Kagawa | B01D 69/1216 264/284 |
| RE35,570 | E | 7/1997 | Rowenhorst | |
| 6,027,802 | A | 2/2000 | Lin | |
| 6,045,858 | A * | 4/2000 | Hamano | C09J 7/22 427/208.4 |
| 6,406,355 | B1 | 6/2002 | Keeler | |
| 6,432,527 | B1 | 8/2002 | Perez | |
| 6,635,334 | B1 | 10/2003 | Jackson | |
| 8,123,828 | B2 | 2/2012 | Culler | |
| 8,142,531 | B2 * | 3/2012 | Adefris | B24D 11/001 428/142 |
| 8,530,021 | B2 | 9/2013 | Bartusiak | |
| 8,764,865 | B2 | 7/2014 | Boden | |
| 8,771,801 | B2 | 7/2014 | Moren | |
| 9,096,013 | B2 * | 8/2015 | Kagawa | B29C 59/007 |
| 9,776,302 | B2 | 10/2017 | Keipert | |
| 2003/0150169 | A1 | 8/2003 | Annen | |
| 2005/0233102 | A1 * | 10/2005 | Kagawa | B29C 59/04 428/156 |
| 2009/0022927 | A1 * | 1/2009 | Strobel | B26F 1/26 425/290 |
| 2011/0052873 | A1 | 3/2011 | Sunouchi et al. | |
| 2013/0301150 | A1 | 11/2013 | Ehnes | |
| 2015/0000209 | A1 * | 1/2015 | Louapre | B24D 3/00 51/307 |
| 2015/0010700 | A1 | 1/2015 | Bartusiak | |
| 2016/0128876 | A1 | 5/2016 | Chandrasekaran | |
| 2017/0246656 | A1 * | 8/2017 | Allen | B65H 23/02 |
| 2017/0361550 | A1 | 12/2017 | Hager | |
| 2018/0215090 | A1 * | 8/2018 | Kagawa | B29C 59/046 |
| 2019/0061279 | A1 * | 2/2019 | Hou | B32B 3/10 |

FOREIGN PATENT DOCUMENTS

| | | |
|---|---|---|
| WO | WO 2010-077491 | 7/2010 |
| WO | WO 2010-077495 | 7/2010 |
| WO | WO 2010-077509 | 7/2010 |
| WO | WO 2010-077519 | 7/2010 |
| WO | WO 2011-005425 | 1/2011 |
| WO | WO 2012-112305 | 8/2012 |
| WO | WO 2015-100319 | 7/2015 |
| WO | WO 2016-105501 | 6/2016 |
| WO | WO 2018-026669 | 2/2018 |

* cited by examiner

MICROFRACTURED FILM AND METHOD FOR MAKING

CROSS REFERENCE TO RELATED APPLICATIONS

This application is a national stage filing under 35 U.S.C. 371 of PCT/IB2019/052505, filed Mar. 27, 2019, which claims the benefit of provisional Application No. 62/649,672, filed Mar. 29, 2018, the disclosure of which is incorporated by reference in its/their entirety herein.

BACKGROUND

Adhesive tapes have found wide use e.g. in homes, offices, and so on, and are used in various applications including e.g. joining, sealing, packaging, masking, mounting, and so on.

SUMMARY

In broad summary, herein is disclosed a method for imparting hand-tearability to an organic polymeric film by impinging a multiplicity of ceramic microblades on a major surface of the organic polymeric film. The resulting microfractured organic polymeric film can be used e.g. as a hand-tearable tape backing for a hand-tearable adhesive tape. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
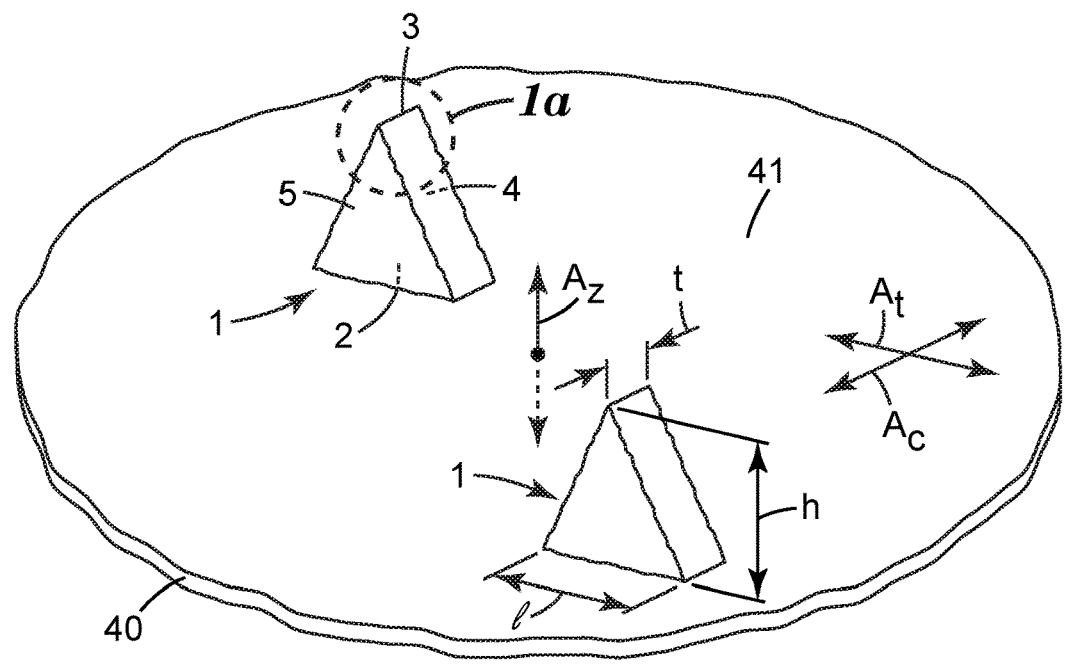
FIG. 1 is a perspective view of exemplary ceramic microblades disposed on a major surface of a supporting substrate.

Like reference numbers in the various figures indicate like elements. Some elements may be present in identical or equivalent multiples; in such cases only one or more representative elements may be designated by a reference number but it will be understood that such reference numbers apply to all such elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted.

As used herein, the terms transverse and circumferential are used with respect to a supporting substrate that is mountable on a supporting roll and that supports ceramic microblades on its radially-outward surface, as discussed in detail herein. Circumferential refers to a direction extending around the cylindrical length of the supporting substrate (and corresponds to the direction of motion of a film that is being processed by the supporting roll and substrate). Transverse refers to a direction across the lateral width of the supporting substrate (and corresponds to the transverse (crossweb) direction of a film being processed by the supporting roll and substrate). The normal axis of the substrate refers to the axis that is normal to the major plane of the substrate. Circumferential, transverse and normal axes $A_c$, $A_t$ and $A_z$ of an exemplary supporting substrate are identified in various Figures herein.

Terms such as height, width, and length are used with respect to a ceramic microblade that is disposed on a major surface of a supporting substrate. The height direction refers to a long axis of the microblade in a direction generally normal to the major plane of the supporting substrate. The length direction refers to the longest axis of the microblade that is generally aligned with the major plane of the supporting substrate. The thickness direction refers to the shortest dimension of the microblade that is generally aligned with the major plane of the supporting substrate. The term blade-tip length refers to the length of a microblade at the tip of the blade; this length may often correspond to the blade thickness at the blade tip. Height, length and thickness directions h, l and t, and the blade-tip length $L_{bt}$ of exemplary microblades are identified in various Figures herein.

All references to percentages of microblades will be understood to be number averages (rather than e.g. weight averages). As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Figure 6:
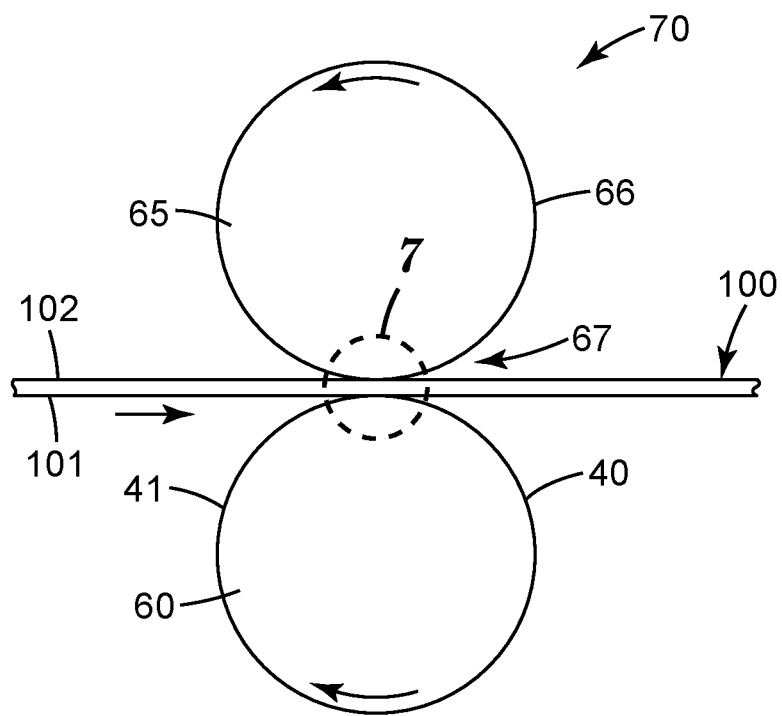
FIG. 6 is a side schematic view of an exemplary apparatus and process for impinging a multiplicity of ceramic microblades on a major surface of an organic polymeric film.
Figure 7:
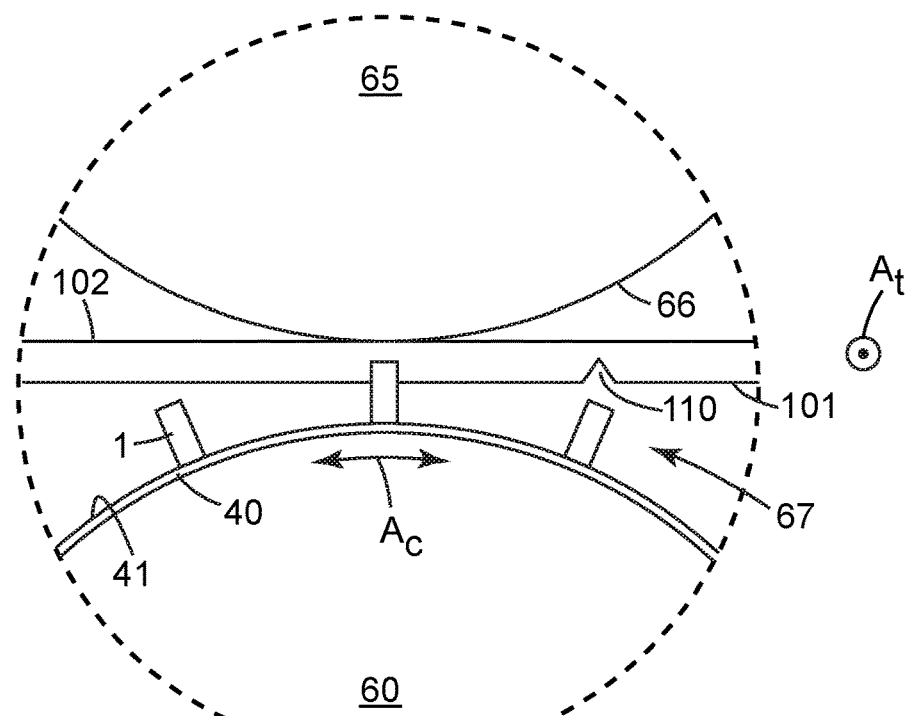
FIG. 7 is a magnified view of a portion of the apparatus and process of FIG. 6.

Disclosed in FIG. 1 in perspective view are exemplary ceramic microblades 1 that are disposed on a major surface 41 of a supporting substrate 40. (Although supporting substrate 40 is often curved to be mounted on a supporting roll 60 as shown in FIGS. 6 and 7, substrate 40 is shown in a generally planar in condition FIG. 1 for ease of presentation.) With supporting substrate 40 mounted on a supporting roll 60 as in FIGS. 6 and 7, ceramic microblades 1 can be impinged on a major surface 101 of an organic polymeric film 100 so that at least some of the ceramic microblades 1 penetrate partially through the thickness of the organic polymeric film. This may be done by, for example, passing the organic polymeric film 100 through a nip between the supporting roll 60 and a backing roll 65 as shown in FIGS. 6 and 7. The penetration of the ceramic microblades into the organic polymeric film can generate microfractures e.g. as depicted in exemplary detail in FIG. 8; such microfractures can render the organic polymeric film hand-tearable.

By a ceramic microblade is meant an inorganic material (e.g. a metal oxide) that has been purposefully formed (e.g. by molding) to a specified shape (e.g. a triangle) and to a specified size range. Thus, ceramic microblades do not encompass particles that are obtained by crushing of bulk inorganic materials (i.e., materials that were never formed to a specified particle size and shape); such crushed materials, even when screened, typically exhibit a range of sizes and shapes. It will be noted however that the requirement that ceramic microblades do not encompass conventional crushed materials does not preclude ceramic microblades from including a mixture of ceramic materials that have been shaped to different sizes and/or shapes, and/or from including some non-zero number of shards that result from the fracturing of shaped (e.g. molded) inorganic particles. By definition, a ceramic microblade excludes e.g. metal particles, metal shavings, and the like, whether such materials are pure metals, metal alloys (e.g. carbon steel) or the like.

Figure 1A:
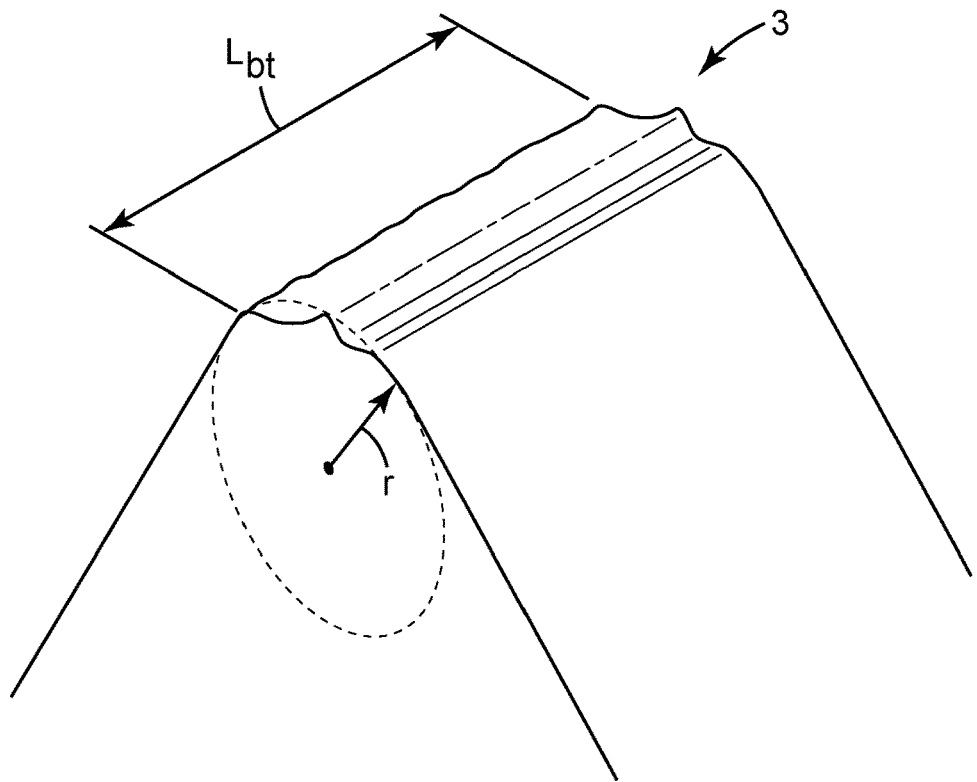
FIG. 1a is a magnified view of a portion of an exemplary microblade of FIG. 1.

As defined herein, a microblade is a ceramic particle that has been shaped to comprise a blade tip 3 that exhibits a radius of curvature r of less than 20 microns and that exhibits a blade-tip aspect ratio of blade-tip length $L_{bt}$ to blade-tip radius of curvature r that is at least 10:1, as discussed in detail later herein. A microblade will often exhibit identifiable major side surfaces (e.g., at least generally opposing surfaces) 4 and 5 that define a thickness therebetween, and may often exhibit an overall (height to thickness) aspect ratio of at least 2:1 and a length to thickness aspect ratio of at least 2:1. The height, thickness and length h, t and l (as well as blade-tip length $L_{bt}$ and blade-tip radius of curvature r) of an exemplary microblade l are identified in FIGS. 1 and 1a, and are discussed in further detail later herein.

The ceramic microblades can be made by any process by which inorganic particles can be suitably shaped, e.g. molded. Methods of making shaped particles are discussed e.g. in U.S. Pat. No. 8,142,531, which is incorporated by reference herein in its entirety. In some embodiments it may be convenient to produce ceramic microblades by sol-gel molding processes in which a precursor (e.g. a dispersion of particles that can be converted into a material such as e.g. alpha alumina) is filled into a molding cavity as a flowable mixture. The precursor can then be at least partially solidified (e.g. by removing a volatile component from the precursor) and then removed from the molding cavity as a solid or semi-solid item. The item can then be e.g. further dried, calcined, and/or sintered (e.g., fired) to finish transforming the item into a ceramic microblade. The microblades may be made of any suitable composition. In many convenient embodiments, the microblades are composed of alpha alumina. However, in general, the microblades may be made from any precursor that can be processed (e.g. molded) as disclosed herein. Such precursors may be chosen from e.g. silicon carbide, alumina/zirconia, boron carbide, aluminum trihydrate, boehmite, and bauxite. The thus-produced microblades may exhibit any desirable hardness. For example, the microblades may exhibit a Mohs hardness of at least 4, 5, 6,7, 8, or 9. In some embodiments, at least some of the microblades will be triangles. However, other shapes are possible, as discussed later herein.

The condition that the ceramic particles are microblades takes into consideration not merely their shape (e.g. their blade tip radius of curvature and aspect ratio) but also their positioning on the supporting substrate. Specifically, the ceramic microblades 1 are mounted on a major surface 41 of a supporting substrate 40 in an at least generally upright configuration as shown in exemplary embodiment in FIG. 1. (The designation of "upright" is with reference to the major plane of the supporting substrate 40 and does not require any particular orientation with regard to e.g. the Earth's gravity; also, any curvature of substrate 40 that results from mounting substrate 40 on a supporting roll as discussed later herein, can be ignored when performing such an evaluation.) By an at least generally upright configuration is meant that for at least 70% of the microblades, the height direction of each microblade is oriented within 20 degrees of the local normal ($A_z$) axis of the supporting substrate 40. It will be appreciated that an arrangement of particles obtained e.g. from crushing bulk materials and depositing the resulting particles on a substrate by conventional methods would not be considered to be provide microblades of the type disclosed herein.

Microblades may be deposited onto major surface 41 of substrate 40 in an at least generally upright configuration by, for example, electrostatic deposition. For example, electrostatic deposition methods can be used in which particles are oriented by an electrostatic field so that significant number of the particles align their longitudinal axis parallel to the electrostatic field and thus achieve an erect orientation with regard to the substrate. Methods of electrostatically depositing particles are discussed e.g. in U.S. Pat. No. 8,771,801, which is incorporated by reference herein in its entirety. Suitable processes may also include passing the particles through a set of apertures that are configured to orient the particles with their long axes at least generally normal to the substrate. In various embodiments at least 80, 85, 90, 95, 98, or 99 percent or more, of the microblades may be oriented (referring again to the height direction of the microblades) within 20 degrees of the normal axis of the substrate. In further embodiments, at least 70, 80, 85, 90, 95, 98, or 99 percent or more, of the microblades may be oriented within 15 degrees, or 10 degrees, of the normal axis of the substrate.

Figure 2:
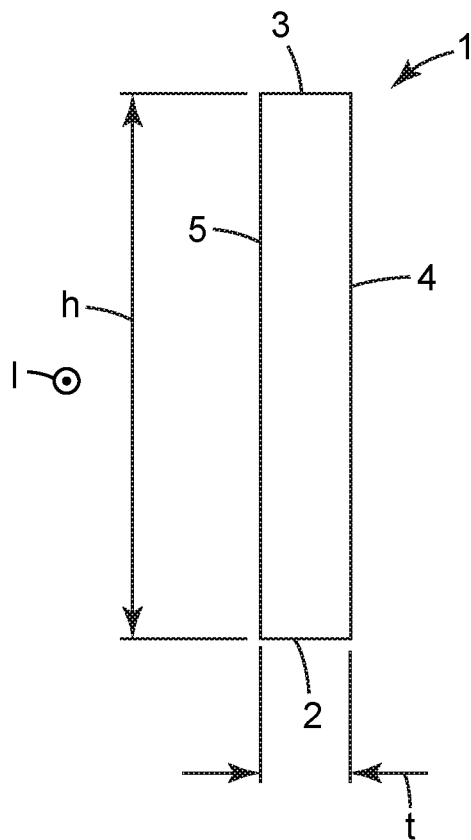
FIG. 2 is an elevation view of an exemplary ceramic microblade of the general type shown in FIG. 1, viewed along a length direction of the microblade.

In some embodiments, a microblade may comprise a base 2 (as shown in FIGS. 1 and 2) with a surface that is at least generally, substantially or essentially normal to the height direction of the microblade, e.g. as shown in exemplary embodiment in FIGS. 1 and 2. (FIG. 2 is a view along the length axis "l" of microblade 1; this corresponds to a view along the transverse axis $A_t$ of substrate 40 that supports the microblade, in the arrangement of FIG. 1.) Such a microblade, when deposited onto a supporting substrate 40 so that base 2 of the microblade rests on major surface 41 of supporting substrate 40, will often stand essentially upright as in FIGS. 1 and 2. That is, the height direction of the microblade will be aligned within e.g. 6, 3, 2 or 1 degrees of the local normal axis of the supporting substrate. However, in some embodiments a microblade may comprise a base 2 with a surface that deviates at least slightly from being normal to the height direction of the microblade, as shown in exemplary embodiment in FIG. 3. Such a microblade may be characterized by a draft angle alpha (α). When such microblades are deposited onto a supporting substrate e.g. by electrostatic deposition so that base 2 lands on major surface 41 of the supporting substrate, the microblades will lean to one side as dictated by the draft angle alpha, as shown in exemplary embodiment in FIG. 4. This leaning of the microblades can be characterized by an angle beta (β) relative to the major plane of the supporting substrate. However, for convenience of description herein, any such leaning of the microblades will be characterized by a leaning angle with respect to the local normal axis $A_z$ of supporting substrate 40. Such a leaning angle can be straightforwardly obtained from a measured angle beta or can be measured directly. In various embodiments, microblades may exhibit a draft angle alpha that is from at least 90 or 95 degrees, to at most 130, 120, 110, 105, or 100 degrees. In various embodiments, microblades, after being deposited onto a major surface of a supporting substrate, may exhibit an angle beta that is from at least 50, 60, 70, or 80 degrees, to at most 85 degrees. In various embodiments microblades, after being deposited onto a major surface of a supporting substrate, may exhibit a leaning angle with respect to the local normal axis of the substrate, of from at least 0, 2, 4, 6 or 8 degrees, to about 40, 30, 20, or 10 degrees. Although microblades 1 of FIG. 4 are shown as being aligned parallel to each other, it will be appreciated that in any actual production process the microblades may be present in a variety of angular orientations.

As noted, a microblade as defined herein will comprise a blade tip 3 that exhibits a radius of curvature r of less than 20 microns. As illustrated in exemplary embodiment in FIG. 1a, the radius of curvature of the tip of a particle (such as e.g. a microblade) is the radius of the smallest circle that, when viewed in a direction orthogonal to a face of the particle including the tip, passes through a point on each of the two sides of the face of the particle that come together to form the tip at the start of a curve of the tip where each of the two sides transition from straight to curved. Methods of obtaining radii curvature of tips of particles are discussed in U.S. Provisional Patent Application 62/369,367 and in PCT Published Application WO 2018026669, both of which are incorporated by reference herein in their entirety. In various embodiments, the radius of curvature of a blade tip of a microblade may be less than 18, 17, 16, 15, 14, 13, 14, 13, 12, 11, 10, 9, 8, 7, 6, 5, 4.5, 4, 3.5, 3, 2.5, 2, 1.5, 1, 0.5, 0.4, 0.3, 0.2, 0.1, 0.05, or 0.01 μn. In further embodiments, the blade-tip radius of curvature may be at least 0.001 μm.

As noted, a microblade will comprise a blade tip 3 that exhibits a blade-tip aspect ratio of blade-tip length $L_{bt}$ to blade-tip radius of curvature r that is at least 10:1. Such a blade-tip aspect ratio is obtained by dividing the blade-tip length $L_{bt}$ (which will often correspond to the thickness t of the microblade at the very tip of the microblade) by the above-described radius of curvature. By way of a specific example, a microblade with a blade-tip length of 50 microns and a blade-tip radius of curvature of 2 microns would have a blade-tip aspect ratio of 25:1. In various embodiments, a blade tip of a microblade may exhibit a blade-tip aspect ratio of at least 15:1, 20:1, 25:1, 30:1, 40:1, 50:1, 60:1, 70:1, 80:1, 90:1, 100:1, or 150:1.

It will be appreciated that many such microblades may exhibit an extremely sharp (small radius of curvature) tip that is very blade-like in character (i.e. that exhibits high blade-tip aspect ratio). For many such microblades, it may be possible to determine that the microblade exhibits a blade-tip aspect ratio of at least e.g. 10:1 or higher by casual inspection e.g. by use of an optical microscope, without necessarily calculating the exact value of the radius of curvature or the blade-tip aspect ratio.

As noted, in some embodiments at least some of the ceramic microblades may be triangular in shape. Such microblades may comprise a base 2 that is bonded to a major surface 41 of supporting substrate 40 and may comprise a terminal peak (tip) 3 that is at an opposite end of the triangular microblade from base 2, as shown in exemplary embodiment in FIG. 1. In various embodiments, at least 50, 70, 90, or 95% of the ceramic microblades may be triangular in shape.

The microblades may be provided in any suitable size range. In various embodiments, a microblade may have a longest dimension (e.g. a length) that is less than 3000, 2500, 2000, 1500, 1000, 800, 700, 600, 500, 400, 300, 200, or 100 microns. In further embodiments, a microblade may have a longest dimension that is more than 50, 150, 250, 350, 450, 550, 650, 850, 1200, 1700, or 2200 microns.

In various embodiments, a microblade may exhibit a height, from base 2 of the microblade to tip 3 of the microblade, that is less than 2500, 2000, 1500, 1000, 800, 700, 600, 500, 400, 300, 200, or 100 microns. In further embodiments, a microblade may have a height that is more than 40, 50, 150, 250, 350, 450, 550, 650, 850, 1200, 1700, or 2200 microns. In many embodiments the microblades may be configured so that the height of the microblades as disposed on a supporting substrate is much greater than the thickness of an organic polymeric film into which the microblades will be penetrated. In various embodiments, at least some of the ceramic microblades may exhibit a height, from base 2 of the microblade to tip 3 of the microblade, that is at least 2, 4, 8, 16, or even 32 times the thickness of the organic polymeric film upon which the microblades are to be impinged. In further embodiments, at least some of the ceramic microblades may exhibit a height that is no more than 100, 50, or 25 times the thickness of the polymeric film. The "height" of a microblade for purposes of this and other calculations herein is to be measured along the actual extent of the microblade (rather than strictly along the normal axis of the substrate) even if the microblade is leaning as described earlier herein. In various embodiments, at least 50, 70, 90, or 95% of the ceramic microblades may meet any of the above-listed criteria. In various embodiments, the thickness of a microblade (whether or not the microblade is e.g. triangular in shape) may range from at least 10, 20, 40, 80, 120, 150, or 200 microns to at most 1000, 700, 300, or 180 microns.

In many embodiments, the ceramic microblades may be at least generally, substantially or essentially similar in size and shape. That is, they may all be molded to a common size and/or shape. Accordingly, when the microblades are deposited onto a supporting substrate, many of them may exhibit a similar height. Thus in various embodiments, some percentage of the microblades may exhibit a height, from the base of the microblade to the tip (terminal peak) of the microblade, that is within plus or minus 20%, 10%, or 5% of an average base-to-tip height of the entire population of ceramic microblades. In various embodiments, at least 50, 70, 90, or 95% of the ceramic microblades may meet any of these criteria.

In various embodiments, at least some of the ceramic microblades 1 will exhibit a height-to-thickness (h/t) aspect ratio of at least 3:1, 4:1, 5:1 or 6:1. Such an aspect ratio will be calculated from the height of the microblade and the thickness of the microblade. If the thickness is variable the average thickness over the area of major surfaces 4 and 5 of the microblade may be used. In various embodiments, at least 50, 70, 90, or 95% of the ceramic microblades may meet the above-listed criteria. In various embodiments, at least some of the ceramic microblades 1 will exhibit a length-to-thickness (l/t) aspect ratio of at least 3:1, 4:1, 5:1 or 6:1. By length is meant the maximum length (in the in-plane direction of the substrate upon which the microblade is disposed) of the microblade, typically along the base of the microblade. In various embodiments, at least 50, 70, 90, or 95% of the ceramic microblades may meet any of these criteria. In further embodiments, at least 50, 70, 90, or 95% of the ceramic microblades will exhibit a height-to-thickness (h/t) aspect ratio of at least 3:1, 4:1, 5:1 or 6:1 and will exhibit a length-to-thickness (l/t) aspect ratio of at least 3:1, 4:1, 5:1 or 6:1.

An aspect ratio of a particle such as a ceramic microblade 1 may also be characterized in terms of a volumetric aspect ratio. The volumetric aspect ratio is defined as the ratio of the maximum cross sectional area passing through the centroid of the particle divided by the minimum cross sectional area passing through the centroid. In various embodiments, at least 50, 70, 90, or 95% of the ceramic microblades may exhibit a volumetric aspect ratio of greater than 1.5, 2.0, 2.5, 3.0, or 5.0. While it may be convenient in some embodiments to use triangular microblades of the general type shown in FIG. 1, at least some of the microblades may have any desired shape (i.e. when viewed in silhouette along the thickness direction of the microblade), as long as they present a microblade tip as defined and described earlier herein. For example, at least some microblades may be equilateral triangles, isosceles triangles, right triangles, oblique triangles, acute triangles, obtuse triangles, and so on. In some embodiments, at least some of the microblade may not be triangles. For example, at least some microblades may be truncated triangles (e.g. trapezoids or isosceles trapezoids), rectangles (including squares), rhombuses, diamonds, kites, irregular quadrilaterals, and so on.

In some such embodiments the microblade may not exhibit a flat base 2 of the type exhibited by the microblades of FIGS. 1 and 2. Rather, a microblade may have a variable bottom surface, may have one or more protrusions extending downward therefrom (in these descriptions, terms such as bottom and downward are used with respect to the height direction of the microblades and do not signify any orientation with regard to the Earth), and so on. Any such arrangements are acceptable as long as the variation and/or protrusions of the bottom surface do not unacceptably interfere with depositing the microblade on the major surface of the supporting substrate in an at least generally upright condition.

Figure 3:
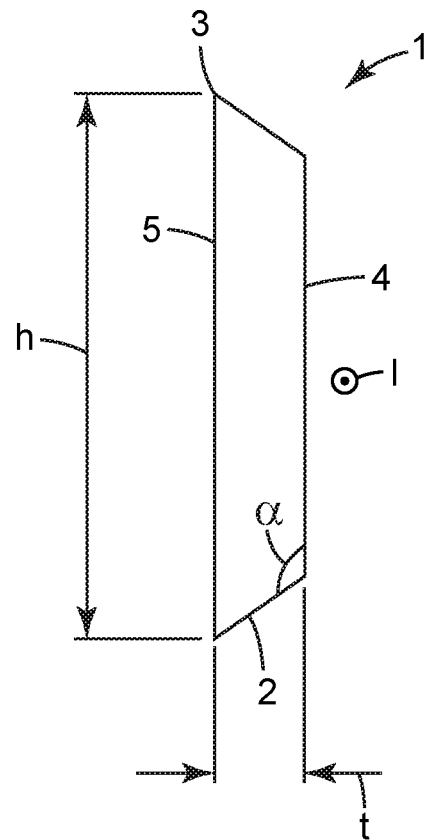
FIG. 3 is an elevation view of another exemplary ceramic microblade, viewed along a length direction of the microblade.
Figure 4:
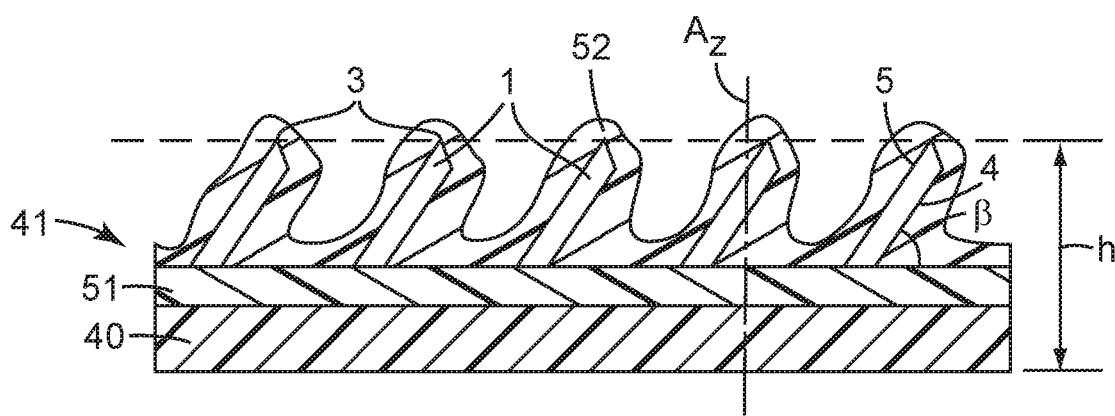
FIG. 4 is a side schematic cross-sectional view of exemplary ceramic microblades disposed on a major surface of a supporting substrate.

In some embodiments, the microblades may exhibit major opposing surfaces 4 and 5 that are not necessarily as uniformly planar as depicted in FIGS. 1, 2 and 3. Thus, in some embodiments at least some of the microblades may be e.g. dish-shaped and/or may have an opening therein. Methods of making particles with features of these general types are discussed in U.S. Pat. No. 8,123,828, which is incorporated by reference in its entirety herein. In some embodiments at least some of the microblades may comprise grooves therein. Methods of making particles with features of this general type are discussed in U.S. Pat. No. 8,764,865, which is incorporated by reference in its entirety herein.

The microblades may be present on the major surface of the supporting substrate at any desired area density, by which is meant the number of particles per unit area of the supporting substrate. In various embodiments, the microblades may be present at an area density of at least 10, 50, 100, 125, 175, 225, 275, 325, 350, 425, or 500 microblades per square cm. In further embodiments, the microblades may be present at an area density of at most about 10000, 5000, 4000, 2000, 1000, 800, 600, 400, 300, 250, 200, or 150 microblades per square cm.

In some embodiments the microblades may be disposed on the major surface of the supporting substrate in a random pattern. This randomness can apply to the distribution of the microblades over the area of the substrate (e.g. the spacing between the individual microblades) and/or to the angular orientation of the length direction of the individual microblades relative to each other and relative to the transverse axis of the supporting substrate on which the microblades are disposed.

Figure 5:
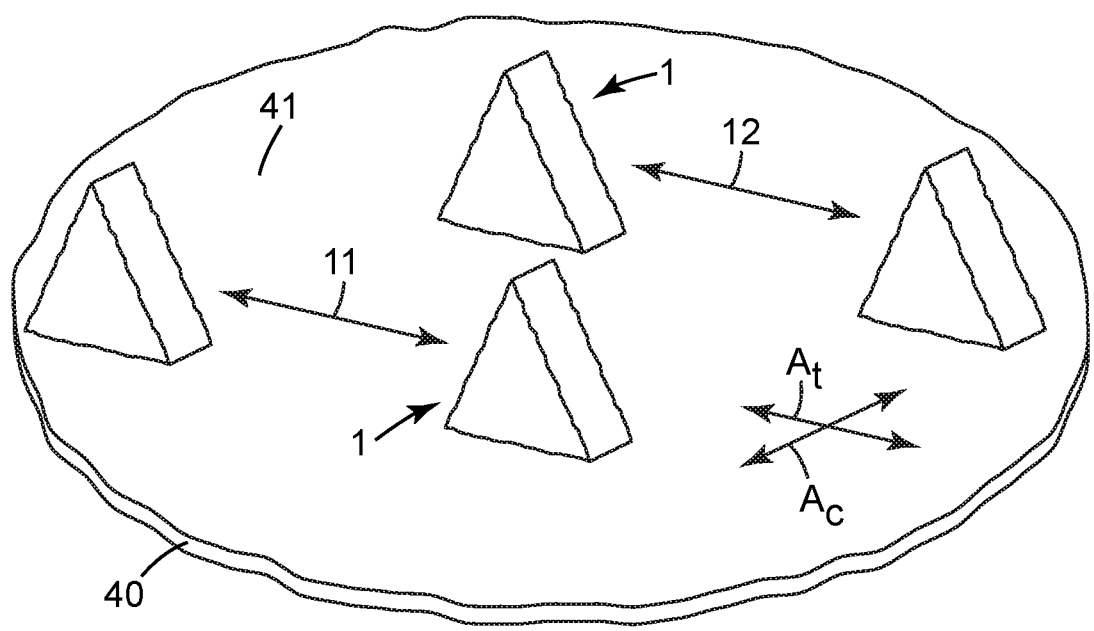
FIG. 5 is a perspective view of exemplary ceramic microblades arranged on a major surface of a supporting substrate.

In some embodiments, at least some of the microblades may be disposed on the supporting substrate in a desired, e.g. non-random, pattern or spacing. For example, in some embodiments the microblades may be disposed on the supporting substrate in discrete lanes that are each aligned at least generally, substantially or essentially with the transverse axis of the supporting substrate. Thus in various embodiments, at least 50, 70, 90, or 95% of the microblades may be arranged in lanes that are oriented within 20, 15, or 10 degrees of the transverse axis of the supporting substrate. By way of a specific example, in the exemplary embodiment in FIG. 5, the ceramic microblades 1 are disposed in first and second lanes 11 and 12, each lane being essentially aligned with the transverse axis $A_t$ of the supporting substrate.

In some embodiments, at least some of the ceramic microblades may be disposed on the supporting substrate in a non-random angular orientation. For example, the ceramic microblades may be angularly oriented so that their blade-tip length direction is at least generally, substantially, or essentially aligned with the transverse axis of the supporting substrate. Thus in various embodiments, at least 50, 70, 90, or 95% of the microblades may be angularly oriented so that their blade-tip length direction is oriented within 20, 15 or 10 degrees of the transverse axis of the supporting substrate. In some embodiments, the ceramic microblades may be arranged in a non-random angular orientation and in a non-random spacing pattern. In various embodiments, at least 50, 70, 90, or 95% of the ceramic microblades may meet either or both of the above-listed criteria. Methods of depositing particles onto substrates in controlled spacing patterns and/or controlled rotational orientations are discussed e.g. in U.S. Pat. No. 9,776,302, which is incorporated by reference herein in its entirety.

In some embodiments microblades 1 may be bonded to supporting substrate 40 by a layer of organic polymeric resin (e.g. a binder) 51 as shown in FIG. 4. In some embodiments, such a binder layer may be disposed (e.g. coated) onto substrate 40 and microblades 1 then deposited thereonto so that the bases of the microblades are attached to the surface of the binder layer or are partially embedded in the binder layer. After the microblade deposition process, the binder layer 51 can be hardened. It is noted that in a case in which a binder layer 51 is used to bond microblades 1 to supporting substrate 40, the major surface 41 of supporting substrate 40 on which the microblades are disposed, will be considered to be provided by the outward surface of a binder layer 51. It will be appreciated that a suitably chosen binder layer (e.g. one that is relatively soft and/or thick) may allow a microblade with a base that is e.g. nonplanar or irregular, to be deposited thereon in such manner as to still remain at least generally upright.

As shown in exemplary depiction in FIG. 4, in some embodiments an additional coating 52 of organic polymeric resin may be applied atop microblades 1, e.g. in order to enhance the bonding of the microblades to the supporting substrate. Such a coating may be present if desired, and has not been found to adversely affect the performance of the microblades in penetrating into the organic polymeric film to form microfractures.

Substrate 40 may be any substrate that possesses sufficient mechanical integrity to support ceramic microblades 1 during the process of impinging the microblades onto an organic polymeric film. In many embodiments, substrate 40 will be sufficiently flexible to allow the microblade-bearing substrate to be mounted onto a supporting roll. Suitable substrates may be chosen from e.g. polymeric films, metal foils, woven fabrics or cloths, knitted fabrics or cloths, paper, vulcanized fiber, nonwovens. Laminates and combinations of any of these may be used.

As noted, substrate 40 bearing ceramic microblades 1 on a major surface 41 thereof may be impinged on a major surface of an organic polymeric film to achieve the objects disclosed herein. In some embodiments, substrate 40 may be disposed on a platen that is pressed against a major surface of an organic polymeric film in a "bed-of-nails" approach. However, it may be convenient for substrate 40 to be circumferentially wrapped around a radially-outward surface of a supporting roll 60, as shown in exemplary embodiment in FIGS. 6 and 7. Substrate 40 may be mounted to a supporting roll 60 in any suitable manner. For example, a layer of adhesive may be used to bond the radially-inward surface of substrate 40 to the radially-outward surface of supporting roll 60. Any suitable supporting roll may be used. Metal rolls (e.g. with a radially-outward surface provided by a layer of steel) or rubber-faced metal rolls may be particularly convenient.

Supporting roll 60 can be used in combination with a backing roll 65 to form a nip roll apparatus 70 in which the two rolls collectively provide a nip 67. An organic polymeric film 100 can then be fed into and through the nip between the rotating rolls, during which process the ceramic microblades 1 on major surface 41 of supporting substrate 40 will be impinged on a major surface (surface 101, in FIG. 7) of organic polymeric film 100. The other major surface 102 of organic polymeric film 100 will be supported by surface 66 of backing roll 65. Backing roll 65 may comprise any suitable design; for example, it may comprise a radially-outward surface 66 that is made of any desired material. In some embodiments surface 66 may be provided by a metal such as e.g. steel. However, it may be preferable to use a material with a controlled hardness; for example backing roll 65 may be faced with a radially-outward layer of e.g. silicone rubber, natural rubber, butyl rubber, or any other material with a suitably chosen hardness. In various embodiments, surface 66 of backing roll 65 may exhibit a hardness on the Shore A scale, of at least 40, 50, 60 or 70. In further embodiments, surface 66 may exhibit a Shore A hardness of at most 100, 90, 85, or 80.

Although organic polymeric film 100 is shown in FIGS. 6 and 7 as being fed straight into nip 67, in actuality film 100 may be wrapped to any desired extent around supporting roll 60 and/or around backing roll 65, either before and/or after passing through nip 67. Any number of ancillary rolls (e.g. idler rolls, steering rolls, and so on) may be used in conjunction with nip roll apparatus 70, as will be well understood by those familiar with film processing.

As each successive portion of organic polymeric film 100 passes through the narrowest portion of nip 67, a succession of microblades will be impinged onto major surface 101 of film 100. The microblades 1 will penetrate into major surface 101 of film 100 and partially through the thickness of film 100. By partially through is meant that the apparatus and methods disclosed herein are purposefully arranged so that the microblades will not penetrate completely through the entire thickness of film 100. That is, once the film is separated from the ceramic microblades, cavities (microfractures, as discussed later in detail) 110 will be left behind in film 100. As shown in exemplary embodiment in FIGS. 7 and 8, microfractures 110 are dead-end cavities rather than being through-holes (through-perforations) that extend through film 100 from major surface 101 to major surface 102. It will be understood that in an industrial process using the apparatus and methods disclosed herein, some very small number (e.g., less than 0.5 percent) of through-perforations may occasionally occur as will be expected due to the statistical nature of any real-life industrial process. However, the arrangements disclosed herein will be distinguished from any apparatus or method in which a significant number of through-perforations are purposefully achieved. In other words, the apparatus and methods disclosed herein will be distinguished from, for example, mechanical (e.g. die) punching of through-holes in films, needle-punching of through-holes in films, flame-perforation of through-holes in films, embossing of through-holes in films, laser-perforation of through-holes in films, and so on.

In various embodiments, the microblades may, on average, penetrate into at least 20, 30, 40, 50, or 60% of the thickness of film 100. (By way of a specific example, a microblade whose tip penetrates 40 microns into a film whose thickness is 100 microns, has penetrated 40% into the thickness of the film.) In further embodiments, the microblades may, on average, penetrate into at most 90, 80, 70, or 60% of the thickness of film 100. In addition to the microfractures themselves not being through-holes, in at least some embodiments no through-holes of any kind (e.g. as achieved by any conventional perforation process) are present in film 100.

The fact that the microblades do not penetrate completely through the thickness of film 100 provides that typically, major surface 102 on the opposite side of microfracture-bearing major surface 101 is not affected by the microfracturing process. That is, each microfracture 110 on major surface 101 typically is not accompanied by e.g. a corresponding bulge or dome on the opposing major surface 102. Due to this and to the small size of the microfractures, in many instances the microfractures may not be readily noticeable to the unaided human eye and will not significantly affect the ability of film 100 to be handled by conventional film-handling apparatus and processes.

In some embodiments, the height of microblades 1 may be chosen in view of the thickness of the film 100 that is to be processed. In some embodiments, the average height of the microblades may be less than the thickness of the film to be processed. However, in many embodiments the average height of the microblades may be equal to or greater than, e.g. much greater than, the film thickness as noted earlier herein. By way of a specific example, ceramic microblades with an average height in the range of approximately 430-470 microns have been found to work well for processing organic polymeric films of a thickness in the range of 25-75 microns.

The operating parameters of nip roll apparatus 70 will be arranged (e.g. the distance of closest approach of the radially-outward surfaces of rolls 60 and 65 to each other, the nip pressure at which the rolls are operated, and so on) to ensure that complete penetration of microblades 1 through the entire thickness of film does not occur. In various embodiments, rolls 60 and 65 may be operated at a nip pressure of at least 1, 10, 20, or 40, 80, 100, or 120 pounds per linear inch. In further embodiments, rolls 60 and 65 may be operated at a nip pressure of at most 300, 200, 160, or 140 pounds per linear inch. The line speed and the tension applied to the organic polymeric film can be any suitable value.

In some embodiments, the apparatus and methods disclosed herein may be configured so that ceramic microblades 1 are impinged on a major surface of film 100 while film 100 is held at temperature of less than 40° C. This results from the fact that it is not necessary to heat film 100 to its melting point, or even to its softening point, in order to achieve the effects disclosed herein. That is, the penetration of ceramic microblades 1 into organic polymeric film 100 is a microfracturing process that involves e.g. plastic deformation, cold flow, or the like, as discussed in detail below. Evidence of this is found in the appearance of the microfractures. As shown in exemplary embodiment in FIG. 8 and as discussed in detail below, a microfracture 110 typically does not exhibit the mirror image of the shape of the microblade that caused the microfracture. A microfracturing process is thus distinguished from e.g. so-called hot-embossing processes in which an organic polymeric material is brought to its softening point (e.g., to near its melting point, in the case of a semicrystalline material). In such hot-embossing processes, the polymeric material is typically sufficiently flowable under the embossing conditions that, when separated from the embossing surface, the material exhibits a near mirror-image of the embossing surface. (That is, an embossing protrusion that is e.g. a 4-sided symmetrical pyramid, will result in the formation of a 4-sided symmetrically pyramidal cavity in the material that is embossed.) A microfracturing process as disclosed herein is thus distinguished from embossing processes that are operated at temperatures that are at or above the softening point, e.g. are near the melting point, of an organic polymeric material. A microfracturing process is also distinguished from processes that involve differential heating and cooling of areas of the film (e.g. by impinging a flame on a film that is supported on a backing roll that has cavities on the surface thereof).

Thus in many embodiments, the apparatus and methods disclosed herein may be operated under ambient conditions, e.g. at room temperature without any particular control of the operating temperature. However, if desired, the operating temperature can be controlled, e.g. can be set slightly above (or below) ambient conditions, e.g. by circulating a heating or cooling liquid through the interior of roll 60 and/or of roll 65. In various embodiments, the apparatus and methods may be controlled so that the film is at a temperature that is at least 30, 40, 50, 70, 90, or 110 degrees C. below the melting point of the organic polymeric film when the microblades are impinged thereupon. For example, if the film is polypropylene that exhibits a melting point in the range of 130° C., the film may be held at a temperature of 60° C. or lower when the microblades are impinged thereupon. It will be appreciated that, particularly for oriented films, the absence of any need to process the film at a significantly elevated temperature can ensure that the film does not exhibit unwanted thermal effects (e.g. shrinkage, curling, or the like.)

Figure 8:
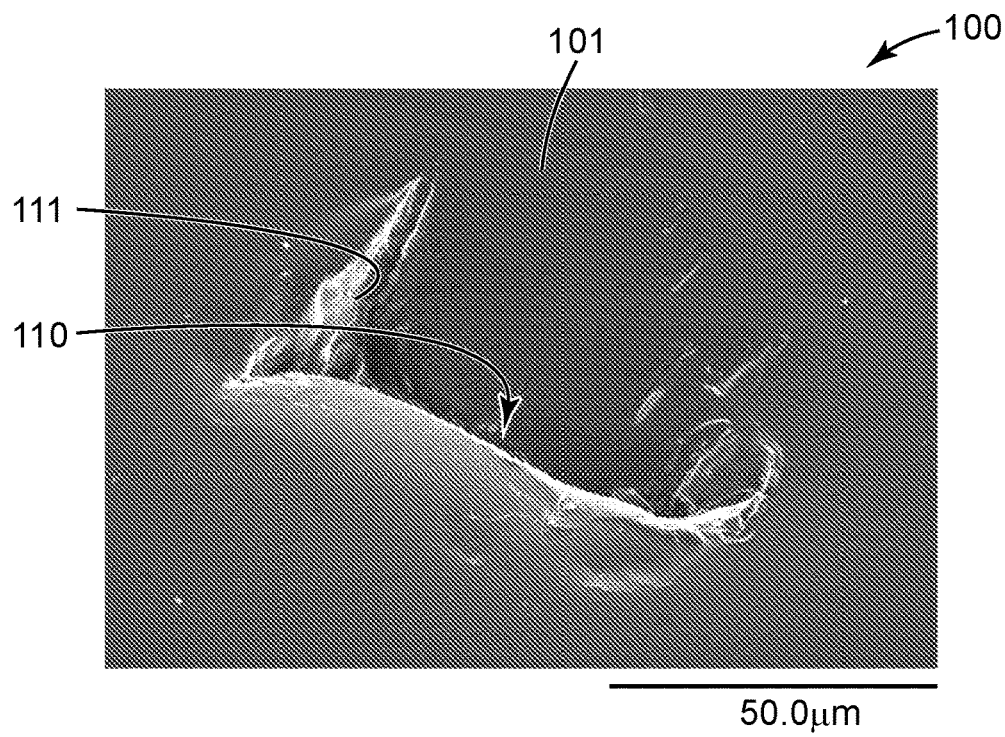
FIG. 8 is a photograph of an exemplary microfracture of an organic polymeric film.

The processing disclosed herein thus provides a microfractured film 100, i.e. a film with at least one major surface 101 bearing a multiplicity of microfractures 110, as shown in exemplary embodiment in FIG. 8. (In many embodiments, only one major surface of the film need be microfractured; however, both sides can be microfractured if desired). The exemplary microfracture 110 shown in FIG. 8 is representative of those found to be produced by the herein-described process of microfracturing using ceramic microblades. As will be evident from FIG. 8, a microfracture is a dead-end cavity that does not penetrate through the entire thickness of the film. A microfracture thus can be readily and easily distinguished from a through-penetration, whether the through-penetration is formed by e.g. die-punching, needle-punching, laser-drilling, flame-perforation, and so on. A microfractured surface 101 will be at least substantially planar except for the microfractured cavities that penetrate thereinto.

Furthermore, while the microfracturing process may occasionally (e.g. in a random, statistical manner) cause a small amount of material to be displaced above the plane of major surface 101, a microfractured surface will be distinguished from a film surface that bears numerous, purposefully made zones that each comprise a central portion that is recessed below a major plane of the film surface and that is completely circumferentially surrounded by a rim that protrudes above the film surface.

A microfracture will typically exhibit a shape generally indicating that it was formed by the penetration of a microblade. However, a microfracture will not be manifested as a cavity that is a mirror image of the ceramic microblade that penetrated into the film to form the microfracture. That is, rather than resulting from a process in which a softened, e.g. molten, polymeric material flows to conform in a near-exact manner to the walls of an embossing tool, a microfracturing process involves a significant degree of solid-phase shearing, as evidenced by wall 111 of the microfracture 110 of FIG. 8, which appears to have been exposed by the shearing away of other portions of the polymeric material. Thus, microfractures will be cavities that are irregularly shaped and are not identical to each other and are not mirror images of the tool used to produce them and thus can be readily distinguished from cavities formed e.g. by hot-embossing of an organic polymeric material. Microfractures can also be distinguished from features formed e.g. by thermally-induced elastic recovery of polymeric materials as the result of a differential heating process. Microfractures may be distinguished from features formed by non-microfracturing processes e.g. by the presence of at least some degree of crazing, shear banding, or any other evidence of e.g. non-linear or plastic deformation, strain hardening, etc. In summary, a microfracture may be identified, and distinguished from other types of dead-end cavities, by the presence of features indicative of localized solid-phase shearing and fracturing processes, and/or by the absence of features indicative of molten polymer flow or polymer relaxation. Such features may be detected by visual inspection, or by any suitable interrogation method, e.g. by evaluation of local optical properties (e.g. birefringence), evaluation of localized crystal structure or lamellar properties, and so on.

Figure 9:
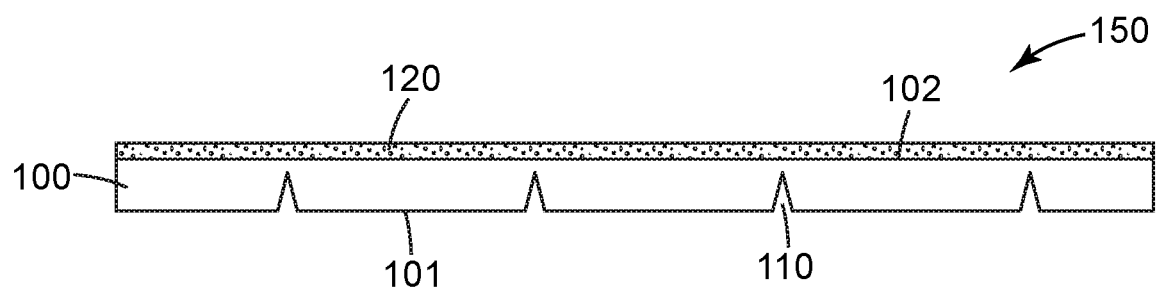
FIG. 9 is a side schematic cross-sectional view of an exemplary pressure-sensitive adhesive tape comprising a layer of pressure-sensitive adhesive disposed on a tape backing that is an organic polymeric film comprising a multiplicity of microfractures.

An organic polymeric film 100 that has been processed to comprise microfractures 110 as disclosed herein may be used for any suitable purpose. The microfractures may enhance the ability of the film to be torn by hand rather than having to be e.g. cut with scissors or a blade. In many useful embodiments, such an organic polymeric film can serve as a tape backing for an adhesive tape 150 as shown in exemplary embodiment in FIG. 9. Thus, after organic polymeric film 100 is processed as described above, a layer of adhesive (e.g. a pressure-sensitive adhesive) 120 may be disposed (e.g. coated) onto a major surface of film 100. Any suitable pressure-sensitive adhesive may be used, e.g. a natural rubber based adhesive, an acrylate-based adhesive, a silicone-based adhesive, and so on. Pressure-sensitive adhesives, their properties, and compositions and components thereof are discussed in U.S. Pat. No. 8,530,021, the relevant portions of which are incorporated by reference herein in their entirety for this purpose. In some embodiments, the pressure-sensitive adhesive may be disposed on a major surface 102 of film 100 that is opposite the microfractured surface 101. In other embodiments, the adhesive may be disposed on the major surface bearing the microfractures. An opposing surface of film 100 may be treated (e.g. with a release coating or the like) to enhance the ability of the adhesive to detach from the opposing surface e.g. when unrolling the adhesive tape from roll form.

Thus in some embodiments, the microfracturing processes disclosed herein may be performed on a stand-alone organic polymeric film. However, in other embodiments, the microfracturing processes may be performed on an organic polymeric film that already bears a pressure-sensitive adhesive. In such a case, the microfracturing may most conveniently be performed on the opposite major surface of the film from that bearing the adhesive; also, the process parameters (e.g. the hardness of the backing roll, nip pressure, etc.) may be modified in view of the presence of the adhesive layer. Also, of course, the surface 66 of the backing roll may be imparted with a release surface from which the adhesive will release easily. The processes disclosed herein may be performed on an organic polymeric film of any desired width. In some embodiments, the processes may be performed on a width-width roll of film (e.g. a jumbo) that is subsequently slit into numerous narrow-width rolls of film (e.g., after coating of a pressure-sensitive adhesive layer and performing any other desired treatment on the film). The film may be slit by any suitable process, e.g. razor-slitting or score-slitting.

An organic polymeric film 10 that is to be microfractured can be of any suitable composition. The film may be of any desired thickness. In various embodiments the film may be at least 10, 20, 30, 40, 50, 70, or 90 microns thick. In further embodiments the film may be at most 200, 150, 100, 80, 60, 35, or 25 microns thick. The microfracturing process may be particularly suited for use on films that exhibit a relatively high modulus. Thus in various embodiments, film 10 may exhibit a Young's modulus of at least 1.0, 1.5, or 2.0 GPa. In various embodiments, film 10 may be e.g. unplasticized polyvinylchloride, polybutylene succinate, polyester (e.g. PET), or polylactic acid. In some embodiments, film 10 may be polypropylene or a polypropylene blend or copolymer. In particular embodiments, film 10 may be an oriented polypropylene. In further embodiments, film 10 may be biaxially-oriented polypropylene (BOPP).

Providing a multiplicity of microfractures dispersed throughout the area of a tape backing of an adhesive tape can enhance the ease with which the adhesive tape can be torn by hand. That is, the presence of microfractures near the edge of the backing can enhance the ability of an edge-tear to be initiated. And, the presence of microfractures throughout the area of the backing can enhance the ability to propagate the tear across the backing.

For many purposes (e.g. for tapes that are 2 cm or less in width), it may be sufficient that a tear can propagate at least generally across the width of a tape. Thus in such instances, a pattern in which microfractures are arranged randomly, in their spacing and/or in their angular orientation, may be sufficient. However, in some cases it may be desired that the tear be steered along a precise direction. For example (e.g. for a relatively wide tape) it may be desired to steer a propagating tear directly across the width of the tape in a direction closely aligned with the transverse axis of the tape. In such cases, the microblades may be arranged in orderly lanes as described earlier herein, in order that the resulting microfractures are arranged in lanes that each extend along the transverse axis of the tape (and that are spaced down the longitudinal axis of the tape.) If desired, the microblades may also be angularly oriented so that their blade-tip length direction is aligned with the transverse axis of the tape, which may further enhance the ability to steer a propagating tear in this direction.

The Edge Tear Force needed to tear a film can be evaluated according to the Edge Tear Force Test Procedures disclosed in the Examples section herein. This test mimics the out-of-plane shearing action that is performed by a user who grasps a film or an adhesive tape by hand and attempts to tear the film or tape e.g. in an at least generally transverse direction across the narrow width of the film or tape. As a general guide, an adhesive tape that is considered to be hand-tearable will exhibit an Edge Tear Force in the range of approximately 4.0 pounds-force or less when tested in this manner. By way of specific examples, biaxially-oriented polypropylene films (of approximately 30 microns thickness) after being microfractured as described herein exhibited an Edge Tear Force in the range of approximately 1-4 pounds-force as evidenced in the Examples section herein. In comparison, a biaxially-oriented polypropylene film that was not microfractured exhibited an Edge Tear Force in the range of approximately 15-17 pounds-force, which is considered to be much too high for acceptable hand-tearability.

It has been found that microfracturing an organic polymeric film, e.g. a biaxially-oriented polypropylene film, can enhance the hand-tearability of the film as noted above, while leaving the tensile strength of the film relatively unaffected. That is, an advantageously significant reduction in the Edge Tear Force that is necessary to tear the film, can be obtained while the tensile strength does not drop by such a significant amount, as evidenced in the examples herein. By way of a specific example, microfracturing of biaxially-oriented, 30-μm polypropylene films reduced the measured tensile strength to approximately 9 pounds-force (in comparison to the original film, which exhibited a tensile strength of approximately 19 pounds-force). This tensile strength was judged to be acceptable (and in the range of that exhibited by many commercially available home and office adhesive tapes). For comparison, biaxially-oriented polypropylene films were processed in similar manner as described herein, but with conventional inorganic particles obtained from crushing of bulk materials rather than with ceramic microblades. While treatment with the conventional inorganic particles did reduce the Edge Tear Force to the range of e.g. 1-2 pounds-force, this was at the cost of reducing the tensile strength to the range of 4-6 pounds-force, which was considered to be unacceptably low for most adhesive tape applications.

Thus in summary, the presence of microfractures seems to promote tear propagation when the microfractured film is subjected to out-of-plane shearing action, but still allows the film to exhibit adequate tensile strength when subjected to in-plane tensile strain. The apparatus and methods disclosed herein thus allow, for example, adhesive tapes to be produced that exhibit sufficient tensile strength for many common uses and yet are tearable by hand.

List of Exemplary Embodiments

Embodiment 1 is a method for imparting hand-tearability to an organic polymeric film, the method comprising: impinging a multiplicity of ceramic microblades on a major surface of the organic polymeric film so that at least some of the ceramic microblades penetrate partially through a thickness of the organic polymeric film to generate microfractures therein; and, separating the organic polymeric film from the multiplicity of ceramic microblades.

Embodiment 2 is the method of embodiment 1 wherein the multiplicity of ceramic microblades are disposed on a radially-outward-facing major surface of a supporting substrate that is circumferentially wrapped around a supporting roll.

Embodiment 3 is the method of embodiment 2 wherein the supporting roll is provided in combination with a backing roll to provide a nip therebetween, and wherein the impinging of the multiplicity of ceramic microblades on the major surface of the organic polymeric film is performed by passing the organic polymeric film through the nip between the supporting roll and the backing roll.

Embodiment 4 is the method of embodiment 3 wherein the method is performed at a nip pressure of from 80 pounds per linear inch to 140 pounds per linear inch.

Embodiment 5 is the method of any of embodiments 3-4 wherein the backing roll comprises a major surface that exhibits a Shore A hardness of from 70 to 90.

Embodiment 6 is the method of any of embodiments 1-5 wherein the multiplicity of ceramic microblades are disposed on a major surface of a supporting substrate so that the ceramic microblades are in an at least generally upright configuration.

Embodiment 7 is the method of any of embodiments 1-6 wherein the ceramic microblades are provided on a major surface of a supporting substrate at an area density of from 100 to 1000 ceramic microblades per square centimeter.

Embodiment 8 is the method of any of embodiments 1-7 wherein at least 70% of the ceramic microblades are arranged on a major surface of a supporting substrate in discrete lanes that are each aligned within 10 degrees of a transverse axis of the supporting substrate.

Embodiment 9 is the method of embodiment 8 wherein at least 70% of the ceramic microblades are angularly oriented so that a blade-tip length direction of the microblade is oriented within 15 degrees of the transverse axis of the supporting substrate.

Embodiment 10 is the method of any of embodiments 1-9 wherein at least 70% of the ceramic microblades are triangular microblades with a base that is bonded to a major surface of a supporting substrate and with a terminal peak that is at an opposite end of the triangular microblade from the base.

Embodiment 11 is the method of any of embodiments 1-10 wherein at least 70% of the ceramic microblades exhibit a blade-tip radius of curvature that is less than 5 microns.

Embodiment 12 is the method of any of embodiments 1-11 wherein at least 70% of the ceramic microblades exhibit a blade-tip aspect ratio of at least 40:1.

Embodiment 13 is the method of any of embodiments 1-12 wherein at least 70% of the ceramic microblades exhibit a height, from a base of the ceramic microblade to a tip of the ceramic microblade, that is within plus or minus 20% of an average base-to-tip height of the entire population of ceramic microblades.

Embodiment 14 is the method of any of embodiments 1-13 wherein at least 70% of the ceramic microblades are comprised of aluminum oxide.

Embodiment 15 is the method of any of embodiments 1-14 wherein the method is performed so that the multiplicity of ceramic microblades are impinged on a major surface of the organic polymeric film with the film at a temperature that is below 40° C. and that is at least 50° C. below a melting point of the organic polymeric film.

Embodiment 16 is the method of any of embodiments 1-15 wherein the ceramic microblades are bonded to a major surface of a supporting substrate by a binder layer comprised of an organic polymeric resin.

Embodiment 17 is the method of any of embodiments 1-16 wherein the organic polymeric film is biaxially-oriented polypropylene.

Embodiment 18 is the method of any of embodiments 1-17 wherein the method further comprises coating a pressure-sensitive adhesive onto a major surface of the organic polymeric film.

Embodiment 19 is the method of any of embodiments 1-18 wherein the method is performed on a wide-width jumbo roll of the organic polymeric film, and wherein the method further comprises a subsequent step of slitting the wide-width jumbo roll into a multiplicity of narrow-width rolls that each exhibits a width of less than 10% of a width of the wide-width jumbo.

Embodiment 20 is a hand-tearable organic polymeric film comprising a multiplicity of microfractures.

Embodiment 21 is the hand-tearable organic polymeric film of embodiment 20 wherein the microfractures are all present on a first major surface of the film and where no microfractures are present on a second, opposing major surface of the film.

Embodiment 22 is the hand-tearable organic polymeric film of any of embodiments 20-21 wherein the microfractures are present at 100-1000 microfractures per square centimeter of a first major surface of the film.

Embodiment 23 is the hand-tearable organic polymeric film of any of embodiments 20-22 wherein the microfractures are arranged on a major surface of a film in discrete lanes that are each aligned within 10 degrees of a transverse axis of the film.

Embodiment 24 is the hand-tearable organic polymeric film of any of embodiments 20-23 wherein the microfractures are irregularly shaped and are not identical to each other.

Embodiment 25 is the hand-tearable organic polymeric film of any of embodiments 20-24 wherein the organic polymeric film is biaxially-oriented polypropylene.

Embodiment 26 is the hand-tearable pressure-sensitive adhesive film comprising: a tape backing comprising the hand-tearable organic polymeric film of any of embodiments 20-25; and, a pressure-sensitive adhesive disposed on a major surface of the tape backing.

EXAMPLES

Test Procedures
Edge Tear Force

A test fixture is used that includes two clamps, one that is fixed and one that is hinged to be able to rotate away from the fixed clamp. Each clamp includes two plates that sandwich together to hold a film area securely therebetween. A film sample (of length 3 inches and width ¾ inch) is positioned in the test fixture. A first area of the film sample is secured in the fixed clamp and a second area of the film sample is secured in the hinged clamp. The adjoining edges of the fixed claim and the hinged clamp are spaced slightly apart to provide a small gap (approximately 2 mm) therebetween. The two clamps thus establish a quasi-linear tearing line (where the film crosses the open gap between the fixed clamp and the hinged clamp) along which the film sample will be torn by the shearing force. The film sample is oriented so that this tearing line is along the short axis (the ¾ inch width) of the film sample and so that the rotation axis of the hinged clamp is parallel to the long axis of the film sample. The rotation axis of the hinged clamp is thus perpendicular to the tearing line so that rotational movement of the hinged clamp, with the fixed clamp being held stationary, results in an out-of-plane shearing action being applied to the tearing line of the film sample. The test fixture is thus configured to mimic the shearing action applied when a person grasps a length of tape with each hand and attempts to tear it by hand. The film is mounted approximately 2-3 cm from the axis of rotation.

The hinged clamp is connected to an Instron/MTS mechanical tester that can apply, and monitor, a force on the hinged clamp. The mechanical tester is connected to the end of the hinged clamp that is opposite the hinged end. When the test is initiated, the mechanical tester exerts increasing force on the hinged clamp until the film sample tears at an edge of the film and tears along the tearing line. The test is run at a speed of 115 inches per minute (in terms of the linear speed of the movement of the connection of the mechanical tester to the end of the hinged clamp). The test is typically run multiple times (e.g. on ten or more film samples) and an average Edge Tear Force is calculated and reported.

Tensile Strength

A film sample of 6 inches length by ¾ inch width is placed in a test fixture that comprises first and second clamps, that grasp first and second ends of the film sample. The fixture is connected to an Instron/MTS mechanical tester that applies an increasing force, along the long axis of the film sample, until the film breaks. The test is run at a linear speed of 12 inches per minute. The test is typically run multiple times and an average tensile strength is calculated and reported.

Working Examples

Representative Example

A roll of 30 μm (1.18 mil) thick biaxially-oriented polypropylene (BOPP) organic polymeric film was obtained.

An article comprising a flexible substrate bearing a multiplicity of shaped inorganic particles on one major surface thereof was obtained. The particles were comprised of alumina and were bonded to the flexible substrate (with a phenolic binder) in an at least generally upright configuration. The particles were at least generally in the shape of equilateral triangles with a length in the range of 500-540 microns, a height in the range of 430-470 microns, and an overall, length to thickness aspect ratio in the range of 3:1-4:1. The particles were estimated to comprise a blade-tip radius of curvature of less than 20 microns and a blade-tip aspect ratio of at least 40:1. The width of the flexible substrate was 12 inches.

The back surface of the flexible substrate was sprayed with 3M Super 77 Spray Adhesive, after which the substrate was circumferentially wrapped around the radially-outward surface of a steel supporting roll, with the molded inorganic particles facing outward. The circumferential ends of the flexible substrate were positioned flush together. The diameter of the supporting roll was 12 inches and the width of the supporting roll was 12 inches.

The supporting roll was paired with a backing roll to form a nip-roll apparatus. The backing roll was faced with silicone rubber having a Shore A hardness of 80. The rolls were pressed toward each other to provide a nipping pressure of approximately 125 pounds per linear inch when the film was fed therethrough. The nip-roll apparatus was operated under ambient (room temperature) conditions, at a line speed of approximately 50 feet per minute.

The above-described procedure produced microfractures in a first surface of the BOPP film. The microfractures were estimated to, on average, penetrate approximately halfway through the thickness of the film. No through-perforations were observed in visual inspection of the film. In fact, little or no evidence of the microperforation process could be seen on the second, opposing surface of the film, and, even when viewing the first surface, the microfractures were not readily visible to the unaided human eye.

Samples of this film were tested according to the Edge Tear Force test procedure provided above; the resulting average Edge Tear Force (based on testing of several samples) was approximately 3-4 pounds-force. By way of comparison, the Edge Tear Force of the same BOPP film, without having been microfractured, was approximately 15-17 pounds-force.

Samples of this film were tested according to the Tensile Strength test procedure provided above; the resulting average tensile strength was approximately 9 pounds-force. By way of comparison, the tensile strength of the same BOPP film, without having been microfractured, was approximately 19 pounds-force.

Roll samples of the microfractured film were successfully coated with conventionally available pressure-sensitive adhesive and were converted (slit) into narrow-width (e.g. ~2 cm in width) tapes of the general type suitable for general purpose (e.g. home and office) use. The presence of the microfractures did not affect the ability of the film to be handled by film-roll processing equipment, to be adhesive-coated, converted, and so on.

Comparative Example

A BOPP film as described above was processed in a similar manner to the above. An article was obtained of the type available from 3M Company, St. Paul Minn., under the trade designation 3M MEDIUM ALUMINUM OXIDE CLOTH SHEET, P80 GRIT. This article comprised a flexible substrate bearing inorganic particles believed to be conventional particles obtained by a crushing process. The product was wrapped around a supporting roll and used in similar manner as described above. Comparative Example films processed in this manner exhibited an Edge Tear Force (typically in the range of 1-2 pounds-force) that was acceptable; however these films exhibited a tensile strength (typically in the range of 4-6 pounds-force) that was considered to be unacceptably low for most uses. Processing films with crush-derived particles also resulted in macroscopically-visible damage to the film, and formation of numerous through-holes, in contrast to films that were microfractured as in the Representative Example.

Variation Examples

Numerous repeats and variations of the above Representative Example were performed, with parameters such as the ceramic microblade particle size, nip pressure, line speed, and/or operating temperature being varied. In several instances, microfractured BOPP films were able to be produced that exhibited Edge Tear Force in the range of 1-2 pounds-force. In general, greater microblade particle size and/or higher nip pressure produced more penetration of the microblades into the film and imparted lower Edge Tear Force, within the limitations established by the desired tensile strength. The line speed did not appear to significantly affect the process, in going from e.g. 10 feet per minute to 500 feet per minute. The line tension likewise did not appear to have a significant effect on the process. The temperature of the backing roll and/or the supporting rolls likewise did not appear to have a significant effect on the process.

Other films were processed in generally similar manner as described above in the Representative Example. These films included polybutylene succinate, polylactic acid, polyethylene terephthalate, polyvinyl chloride (plasticized) and polyvinyl chloride (unplasticized). While quantitative Edge Tear Force data was not obtained for all of these films, in general they were able to be processed as disclosed herein with resultant lowering of the force required to initiate and propagate an edge tear, in qualitative evaluations.

In still another variation, a BOPP film was microfractured that was the same as the film of the Representative Example, but was 50 inches wide. This film was microfractured using a large-scale web-handling apparatus as follows. A product was obtained that was substantially the same as that used for the Representative Example, but that was 49 inches wide. The substrate was circumferentially wrapped around a supporting roll that was 50 inches wide and 12 inches in diameter. In this instance the supporting roll was faced with a silicone layer of hardness Shore 40A. The substrate stayed in place well when bonded to the surface of this layer with Super 77 Spray Adhesive in the manner described above. The supporting roll was paired with a backing roll that comprised a layer of Shore hardness 80A (as in the Representative Example) to form a nip apparatus. The BOPP film was processed at 500 feet per minute, resulting in a microfractured area of 49 inches wide with a non-microfractured border of approximately ½ inch in width, along each edge of the BOPP film. This microfractured BOPP film exhibited very similar Edge Tear Force and tensile strength to that of the Representative Example.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. It will be understood that the present document is specifically concerned with using inorganic particles for the purpose of microfracturing a polymer film. No disclosure in this document is to be taken as characterizing any property or usefulness or lack thereof, of any such particles for any other purpose.

Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A method for imparting hand-tearability to an organic polymeric film, the method comprising:

impinging a multiplicity of ceramic microblades on a major surface of the organic polymeric film so that at least some of the ceramic microblades penetrate partially through a thickness of the organic polymeric film to generate microfractures for imparting hand-tearability therein, wherein the ceramic microblades have a pattern of angular orientation of a length direction of individual microblades relative to each other and relative to a transverse axis of a supporting substrate on which the microblades are disposed, wherein a first subset of the ceramic microblades are of a first shape and a second subset of the ceramic microblades are of a second shape that differs from the first shape, and wherein the microfractures are irregularly shaped cavities that are not identical to each other and no microfracture is a mirror image of a corresponding ceramic microblade that penetrated into the organic polymeric film to form any of the microfractures; and, separating the organic polymeric film from the multiplicity of ceramic microblades.

2. The method of claim 1 wherein the multiplicity of ceramic microblades are disposed on a radially-outward-facing major surface of the supporting substrate that is circumferentially wrapped around a supporting roll.

3. The method of claim 2 wherein the supporting roll is provided in combination with a backing roll to provide a nip therebetween, and wherein the impinging of the multiplicity of ceramic microblades on the major surface of the organic polymeric film is performed by passing the organic polymeric film through the nip between the supporting roll and the backing roll.

4. The method of claim 3 wherein the method is performed at a nip pressure of from 80 pounds per linear inch to 140 pounds per linear inch.

5. The method of claim 3 wherein the backing roll comprises a major surface that exhibits a Shore A hardness of from 70 to 90.

6. The method of claim 2 wherein the multiplicity of ceramic microblades are disposed on the major surface of the supporting substrate so that the ceramic microblades are in an at least generally upright configuration.

7. The method of claim 2 wherein the ceramic microblades are provided on the major surface of the supporting substrate at an area density of from 100 to 1000 ceramic microblades per square centimeter.

8. The method of claim 2 wherein at least 70% of the ceramic microblades are arranged on the major surface of the supporting substrate in discrete lanes that are each aligned within 10 degrees of a transverse axis of the supporting substrate.

9. The method of claim 8 wherein at least 70% of the ceramic microblades are angularly oriented so that a blade-tip length direction of the microblade is oriented within 15 degrees of the transverse axis of the supporting substrate.

10. The method of claim 2 wherein at least 70% of the ceramic microblades are triangular microblades with a base that is bonded to a major surface of the supporting substrate and with a terminal peak that is at an opposite end of the triangular microblade from the base.

11. The method of claim 1 wherein at least 70% of the ceramic microblades exhibit a blade-tip radius of curvature that is less than 5 microns.

12. The method of claim 1 wherein at least 70% of the ceramic microblades exhibit a blade-tip aspect ratio of at least 40:1.

13. The method of claim 1 wherein at least 70% of the ceramic microblades exhibit a height, from a base of the ceramic microblade to a tip of the ceramic microblade, that is within plus or minus 20% of an average base-to-tip height of the entire population of ceramic microblades.

14. The method of claim 1 wherein at least 70% of the ceramic microblades are comprised of aluminum oxide.

15. The method of claim 1 wherein the method is performed so that the multiplicity of ceramic microblades are impinged on a major surface of the organic polymeric film with the film at a temperature that is below 40° C. and that is at least 50° C. below a melting point of the organic polymeric film.

16. The method of claim 1 wherein the ceramic microblades are bonded to a major surface of the supporting substrate by a binder layer comprised of an organic polymeric resin.

17. The method of claim 1 wherein the organic polymeric film is biaxially-oriented polypropylene.

18. The method of claim 1 wherein the method further comprises coating a pressure-sensitive adhesive onto a major surface of the organic polymeric film.

19. The method of claim 1 wherein the method is performed on a wide-width roll of the organic polymeric film, and wherein the method further comprises a subsequent step of slitting the wide-width roll into a multiplicity of narrow-width rolls that each exhibits a width of less than 10% of a width of the wide-width roll.

* * * * *